United States Patent

Hreno

[15] 3,667,480
[45] June 6, 1972

[54] CIGARETTE HOLDER AND FILTERING UNIT WITH MOUTHPIECE

[72] Inventor: Stephen Hreno, 29 Dawson Avenue, Clifton, N.J. 07012

[22] Filed: Aug. 11, 1970

[21] Appl. No.: 62,905

[52] U.S. Cl..............................131/207, 131/213, 131/218
[51] Int. Cl. ......................................................A24f 01/16
[58] Field of Search .........................131/197, 207, 213, 218

[56] References Cited

UNITED STATES PATENTS

| 1,118,000 | 11/1914 | Haddad | 131/213 |
| 2,775,971 | 1/1957 | Foreman | 131/213 |
| 43,454 | 7/1864 | Fickey, Jr. | 131/213 X |
| 1,839,505 | 1/1932 | Schulz | 131/213 |
| 830,864 | 9/1906 | Swenson | 131/213 UX |
| 2,170,430 | 8/1939 | Schnaier | 131/213 X |
| 2,150,049 | 3/1939 | Bush | 131/213 X |
| 568,461 | 9/1896 | Sjolander | 131/218 UX |
| 1,074,489 | 9/1913 | Broz | 131/213 X |

FOREIGN PATENTS OR APPLICATIONS

| 11,748 | 1887 | Great Britain | 131/213 |
| 252,568 | 6/1926 | Great Britain | 131/213 |

*Primary Examiner*—Joseph S. Reich
*Attorney*—B. P. Fishburne, Jr.

[57] ABSTRACT

A holder for a cigarette, cigar, or pipe bowl has a socket to receive the article to be smoked and the smoke is caused to circulate through a long filtering passage containing a filtering medium and then through a reversely directed long cooling passage leading through the mouthpiece. The filtering and cooling passages may be reversed. The filtering and cooling passages may extend generally longitudinally of the mouthpiece axis or generally normal thereto.

1 Claim, 6 Drawing Figures

PATENTED JUN 6 1972 3,667,480
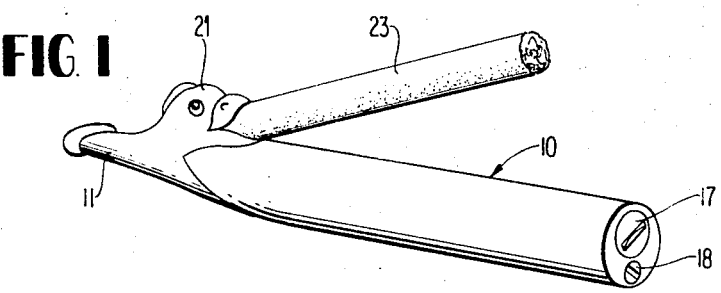
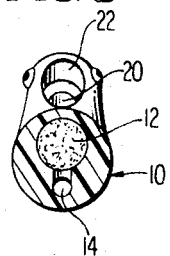
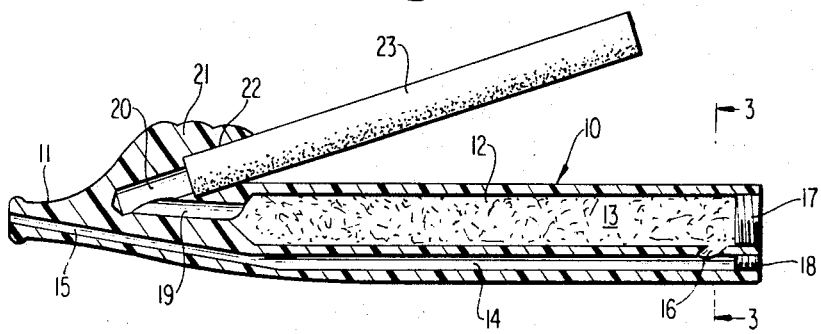
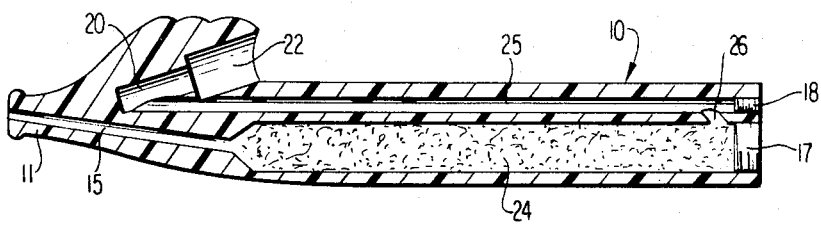
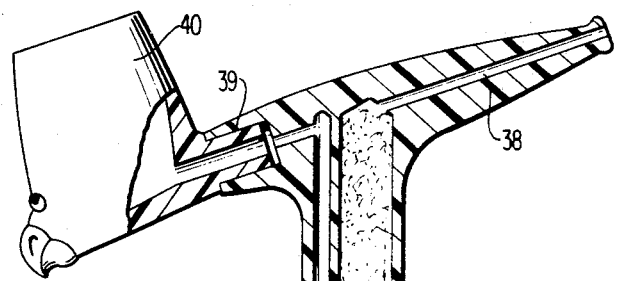
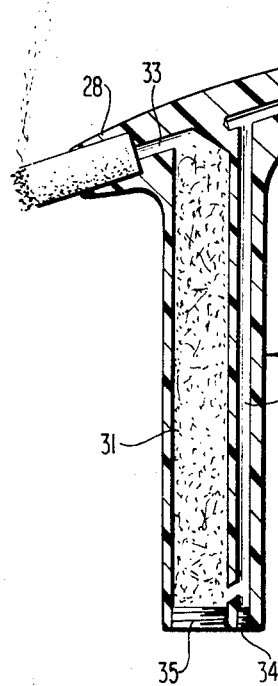
INVENTOR
STEPHEN HRENO
BY B. P. Fishburn Jr.
ATTORNEY

CIGARETTE HOLDER AND FILTERING UNIT WITH MOUTHPIECE

The object of the invention primarily is to provide a cigarette holder having a large effective filtering component followed or preceded by a long air and smoke cooling passage. The device is usable with unfiltered or filtered cigarettes, cigars, or with the bowl of a pipe. Closure plugs are provided for cleaning the filtering and air cooling channels. An integral mouthpiece communicates with either the air cooling or filtering passage and in all cases is remote from the socket which receives the cigarette or other smoking article. The device may be molded or carved to produce a bird or animal head thereon.

BRIEF DESCRIPTION OF DRAWING FIGURES

FIG. 1 is a perspective view showing a preferred form of holder and filtering unit embodying the invention.

FIG. 2 is an enlarged central longitudinal vertical section through the unit shown in FIG. 1.

FIG. 3 is a transverse vertical section taken on line 3—3 of FIG. 2.

FIG. 4 is a cross sectional view similar to FIG. 2 with the air cooling and filtering passages reversed in a modification.

FIG. 5 is a central vertical section through another modified form of the device.

FIG. 6 is a similar view showing still another modification.

DETAILED DESCRIPTION

Referring to the drawings in detail wherein like numerals designate like parts, and directing attention first to FIGS. 1–3, the numeral 10 designates a relatively large preferably cylindrical elongated body portion having an integral mouthpiece extension 11 at one end thereof. The body portion 11 has a relatively large elongated chamber or passage 12 extending therethrough and adapted to receive any desirable smoke filtering medium 13. Many such filtering substances are known in the art and a variety may be employed for the purposes of the invention including simple cotton or more sophisticated substances including charcoal and the like. The body portion 10 is provided with a second relatively small smoke cooling passage 14 parallel to the filtering passage 12 and reversely directed relative thereto and leading directly to a narrow mouthpiece passage 15. The two passages 12 and 14 communicate through a short transverse port 16 near the end of the unit remote from the mouthpiece. The forward ends of the two passages 12 and 14 are closed by removable closure plugs 17 and 18 to facilitate cleaning the device.

At the rear end of the filtering passage 12, a reduced passage extension 19 intersects a divergent angular passage 20 or bore, formed in a side enlargement 21 of the mouthpiece, which may be carved or molded to resemble the head of a bird, fish, or animal, if desired. The bore 20 leads directly into a somewhat enlarged cylindrical opening or socket 22 which receives snugly and removably one end portion of a cigarette 23 or cigar in some cases. The shape of the socket 22 may be modified in shape and size to accommodate a variety of articles to be smoked.

In use, the smoker draws through the mouthpiece passage 15 and smoke is drawn through the cigarette 23 and passages 20 and 19 and then through the long filtering passage 12. The filtered smoke then enters the leading end of the long cooling passage 14 and flows reversely to the mouthpiece. Thus in a relatively short structure approximating the length of popular cigarettes, the smoke is caused to flow in three flow paths each of which is as long, or longer, than the cigarette, one such flow path including the cigarette.

In FIG. 4, the device is constructed identically to the first embodiment except that the relative positions of the filtering and air cooling passages 24 and 25 are reversed. In this case, smoke from the cigarette, not shown, first enters the cooling passage 25 directly from the bore 20 and secondly enters the reverse filtering passage 24 from a small port 26 interconnecting the forward ends of the two passages. The filtered smoke from the passage 24 then enters the mouthpiece passage 15. The overall results are approximately the same as with the preferred form of the invention.

FIG. 5 shows a modification wherein the mouthpiece 27 and the cigarette holding socket 28 are in axial alignment while the body portion or barrel 29 containing the long air cooling and filtering passages 30 and 31 is generally perpendicular to and depending from the mouthpiece. A mouthpiece passage 32 communicates with the cooling passage 30 and is interrupted from direct communication with the port 33 leading to the socket 28. This port communicates with the downstream end of the filtering passage 31 which contains any desirable filtering medium. The lower ends of the passages 30 and 31 are equipped with removable plugs 34 and 35, as previously described. The body portion 29 may be conveniently grasped by the hand. The device in FIG. 5 has the advantage of being shorter but the overall effective results obtained are the same.

FIG. 6 shows the invention substantially as in FIG. 5 although the filtering and cooling passages 36 and 37 are reversed relative to the mouthpiece passage 38 and the socket 39 which is shown holding a tobacco pipe bowl 40 to emphasize the versatility of the invention. All other parts and their functions remain the same as in the previous embodiments and it is believed that the merits of the invention are now clearly understandable without further explanation.

It is to be understood that the forms of the invention herewith shown and described are to be taken as preferred examples of the same, and that various changes in the shape, size and arrangement of parts may be resorted to, without departing from the spirit of the invention or scope of the subjoined claim.

I claim:

1. A cigarette holder comprising an elongated body portion having a mouthpiece extension integrally formed thereon at a rear end thereof, said body portion having a longitudinal relatively small cross section smoke cooling passage and a parallel longitudinal relatively large cross section smoke filtering passage, said cooling and filtering passages being connected near the forward end of the body portion by a transverse port, said mouthpiece extension having a smoke passage formed therethrough connected with and leading from said smoke cooling passage, said cooling and filtering passages being separated and non-communicating throughout their lengths except at said port whereby cigarette smoke is caused to serially flow longitudinally in the body portion through the filtering passage and then through the cooling passage, a smoke filtering mass within said filtering passage to filter smoke flowing therethrough, said body portion having an enlargement on one side thereof adjacent said rear end of the body portion and said mouthpiece extension, said enlargement having an oblique bore formed therein at an acute angle to the axis of the body portion and including a forwardly opening cigarette holding socket enabling a cigarette to be held in upward forwardly divergent relationship to the body portion during smoking and enabling removal and replacement of the cigarette in said socket without disturbing the remainder of the cigarette holder, and the body portion having a relatively short and relatively small cross section longitudinal passage connecting said oblique bore with the rear end of said filtering passage.

* * * * *